(12) United States Patent
Hasegawa et al.

(10) Patent No.: US 10,737,214 B2
(45) Date of Patent: Aug. 11, 2020

(54) NONHYDROCARBON GAS SEPARATION DEVICE AND NONHYDROCARBON GAS SEPARATION METHOD

(71) Applicant: JGC Corporation, Yokohama-shi, Kanagawa (JP)

(72) Inventors: Hiroaki Hasegawa, Yokohama (JP); Hiroshi Umino, Yokohama (JP); Yasushi Fujimura, Yokohama (JP); Aiko Matsuyama, Yokohama (JP); Syuichi Oguro, Yokohama (JP); Keiichi Nishida, Yokohama (JP); Shinji Takahashi, Yokohama (JP)

(73) Assignee: JGC Corporation (JP)

( * ) Notice: Subject to any disclaimer, the term of this patent is extended or adjusted under 35 U.S.C. 154(b) by 137 days.

(21) Appl. No.: 15/763,467

(22) PCT Filed: Oct. 1, 2015

(86) PCT No.: PCT/JP2015/005019
§ 371 (c)(1),
(2) Date: Mar. 27, 2018

(87) PCT Pub. No.: WO2017/056134
PCT Pub. Date: Apr. 6, 2017

(65) Prior Publication Data
US 2018/0280866 A1    Oct. 4, 2018

(51) Int. Cl.
*B01D 53/22* (2006.01)
*B01D 53/26* (2006.01)
(Continued)

(52) U.S. Cl.
CPC ..... *B01D 53/1475* (2013.01); *B01D 53/1468* (2013.01); *B01D 53/22* (2013.01);
(Continued)

(58) Field of Classification Search
None
See application file for complete search history.

(56) References Cited

U.S. PATENT DOCUMENTS 6,221,131 B1    4/2001  Petroleo
9,364,782 B1 *  6/2016  Xie ..................... B01D 71/028

FOREIGN PATENT DOCUMENTS

JP    S63258620 A    10/1988
JP    64-43329 A      2/1989
(Continued)

OTHER PUBLICATIONS

Koch, David R. et al., "Proper Pretreatment Systems Reduce Membrane Replacement Element Costs and Improve Reliability;" UOP—A Honeywell Company; GPA Annual Convention, Mar. 13-16, 2005; pp. 1-18.

*Primary Examiner* — Daniel Berns
(74) *Attorney, Agent, or Firm* — Jordan and Koda, PLLC

(57) ABSTRACT

Provided is a non-hydrocarbon gas separation device or the like capable of separating a non-hydrocarbon gas from a natural gas containing a heavy hydrocarbon. The non-hydrocarbon gas separation device is configured to separate a non-hydrocarbon gas from a natural gas. The natural gas containing a heavy hydrocarbon, the heavy hydrocarbon having 5 or more carbon atoms, is supplied to a separation module (2). The natural gas having been separated from the non-hydrocarbon gas is allowed to outflow from the separation module (2), and the non-hydrocarbon gas having been separated from the natural gas is discharged from the separation module (2). An inorganic membrane (20), which is housed in the separation module (2), and is made of an inorganic material is configured to allow the non-hydrocarbon gas contained in the natural gas to permeate therethrough to a discharge side, and to allow the natural gas having been separated from the non-hydrocarbon gas to flow (Continued)

to an outflow side. A heating unit (3) is configured to heat the natural gas to be supplied to the separation module (2) so that a temperature in the separation module (2) is kept at a temperature higher than a dew point temperature of the heavy hydrocarbon.

3 Claims, 4 Drawing Sheets

(51) Int. Cl.
    *B01D 53/14*     (2006.01)
    *B01D 61/58*     (2006.01)
    *B01D 69/12*     (2006.01)
    *B01D 71/02*     (2006.01)

(52) U.S. Cl.
    CPC ......... *B01D 53/226* (2013.01); *B01D 53/228* (2013.01); *B01D 61/58* (2013.01); *B01D 69/12* (2013.01); *B01D 71/028* (2013.01); *B01D 53/261* (2013.01); *B01D 2253/108* (2013.01); *B01D 2256/24* (2013.01); *B01D 2256/245* (2013.01); *B01D 2257/102* (2013.01); *B01D 2257/304* (2013.01); *B01D 2257/504* (2013.01); *B01D 2259/65* (2013.01); *B01D 2311/103* (2013.01); *B01D 2317/022* (2013.01); *B01D 2317/06* (2013.01)

(56) References Cited

FOREIGN PATENT DOCUMENTS

| | | |
|---|---|---|
| JP | H05103956 A | 4/1993 |
| JP | 2006263574 A | 10/2006 |
| JP | 2009019126 A | 1/2009 |
| JP | 2012-236134 A | 12/2012 |
| WO | 94/04250 A1 | 3/1994 |
| WO | 2010/110994 A2 | 9/2010 |

\* cited by examiner

NONHYDROCARBON GAS SEPARATION DEVICE AND NONHYDROCARBON GAS SEPARATION METHOD

TECHNICAL FIELD

The present invention relates to a technology for separating a non-hydrocarbon gas from a natural gas.

BACKGROUND ART

A natural gas produced from a wellhead is subjected to liquefaction pretreatment for separating impurities, and then cooled to be liquefied, and shipped as a liquidized natural gas (LNG).

Examples of the impurities to be separated from the natural gas through the liquefaction pretreatment include non-hydrocarbon gases, such as a carbon dioxide gas, a nitrogen gas, and a hydrogen sulfide gas, and as well, mercury and water.

As a non-hydrocarbon gas separation device configured to separate a non-hydrocarbon gas from a natural gas, there is given a separation device utilizing a gas separation membrane. This kind of non-hydrocarbon gas separation device is hardly accompanied by a phase change at the time of gas separation, and is configured to perform gas separation by using, as a drive energy, a difference in pressure (difference in partial pressure) of a gas to be separated before and after its permeation through the gas separation membrane, and utilizing a difference in gas passage speed through the gas separation membrane. Therefore, such method has high energy saving performance and easy handleability as compared to a cryogenic separation method, a pressure swing absorption (PSA) method, and an absorption method involving using an absorption liquid.

For example, in Patent Literature 1, there is a description of a carbon dioxide separation system in which a primary carbon dioxide separation device equipped with a zeolite membrane for carbon dioxide separation and a secondary carbon dioxide separation device that employs an amine absorption method or a PSA method are connected in series. The carbon dioxide separation system has an object to remove carbon dioxide from a gas that has undergone an exhaust gas shift reaction in an integrated coal gasification combined cycle plant or from a natural gas, and thus produces a carbon-dioxide-removed gas having a carbon dioxide concentration of 2% or less from a mixed gas having a carbon dioxide concentration of from 3% to 75%.

CITATION LIST

Patent Literature

[PTL 1] JP 2012-236134 A: claims 1 and 9, paragraphs 0034 to 0039, and FIG. 1

SUMMARY OF INVENTION

Technical Problem

A production amount of a non-conventional natural gas has been increased in recent years. The non-conventional natural gas contains a non-hydrocarbon gas at a relatively high concentration, and in some cases, further contains, for example, a hydrocarbon having 5 or more carbon atoms (hereinafter referred to as "heavy hydrocarbon"). In such cases, it is difficult to develop a practical non-hydrocarbon gas separation device unless an influence of coexistence of the non-hydrocarbon gas and the heavy hydrocarbon in the natural gas is sufficiently considered.

Regarding this point, in Patent Literature 1 described above, there is no description of a technology for treating a natural gas containing a heavy hydrocarbon.

The present invention has been made in view of such background, and an object of the present invention is to provide a non-hydrocarbon gas separation device and a non-hydrocarbon gas separation method capable of separating a non-hydrocarbon gas from a natural gas containing a heavy hydrocarbon.

Solution to Problem

According to one embodiment of the present invention, there is provided a non-hydrocarbon gas separation device, which is configured to separate, from a natural gas containing a non-hydrocarbon gas, the non-hydrocarbon gas, the non-hydrocarbon gas separation device including:

a separation module connected to a supply line configured to supply the natural gas containing a heavy hydrocarbon, the heavy hydrocarbon having 5 or more carbon atoms, an outflow line configured to allow the natural gas having been separated from the non-hydrocarbon gas to outflow, and to a discharge line configured to discharge the non-hydrocarbon gas having been separated from the natural gas;

an inorganic membrane, which is made of an inorganic material, and is housed in the separation module, the inorganic membrane being configured to allow the non-hydrocarbon gas contained in the natural gas supplied from the supply line to permeate therethrough to a discharge line side, and to allow the natural gas having been separated from the non-hydrocarbon gas to flow to an outflow line side; and a heating unit, which is arranged on a supply line side, and is configured to heat the natural gas, in which the heating unit is configured to heat the natural gas to be supplied to the separation module so that a temperature in the separation module is kept at a temperature higher than a dew point temperature of the heavy hydrocarbon in response to a reduction in temperature in association with permeation of the non-hydrocarbon gas through the inorganic membrane.

The non-hydrocarbon gas separation device may have the following features.

(a) The non-hydrocarbon gas is at least one selected from the group consisting of a carbon dioxide gas, a nitrogen gas, and a hydrogen sulfide gas. In this case, the non-hydrocarbon gas is a carbon dioxide gas, and a concentration of the carbon dioxide gas in the natural gas is 5 mol % or more.

(b) The non-hydrocarbon gas separation device includes at least two of the separation modules to be connected to each other in series, and the heating unit is arranged on a supply line side of at least one of the separation modules.

(c) The non-hydrocarbon gas separation device includes: an adsorption column packed with an adsorbent for adsorbing at least any one of water or the heavy hydrocarbon; and a regeneration gas line configured to supply a preheated regeneration gas to the adsorption column for a regeneration operation of heating the adsorbent to allow a component having been adsorbed thereon to be released, in which the heating unit uses the regeneration gas as a heat source.

Further, according to another embodiment of the present invention, there is provided a non-hydrocarbon gas separation method, including separating, from a natural gas containing a non-hydrocarbon gas, the non-hydrocarbon gas, the non-hydrocarbon gas separation method including the steps of:

supplying the natural gas containing a heavy hydrocarbon, the heavy hydrocarbon having 5 or more carbon atoms, to a separation module in which an inorganic membrane made of an inorganic material is housed, from a supply line connected to the separation module;

allowing the non-hydrocarbon gas contained in the natural gas supplied from the supply line to permeate the inorganic membrane to be separated, followed by discharging the non-hydrocarbon gas having been separated from the natural gas from a discharge line connected to the separation module;

allowing the natural gas having been separated from the non-hydrocarbon gas to flow through the separation module, followed by allowing the natural gas to outflow from an outflow line connected to the separation module; and heating, with a heating unit which is arranged on a supply line side, and is configured to heat the natural gas, the natural gas to be supplied to the separation module so that a temperature in the separation module is kept at a temperature higher than a dew point temperature of the heavy hydrocarbon in response to a reduction in temperature in association with permeation of the non-hydrocarbon gas through the inorganic membrane.

Advantageous Effects of Invention

The present invention includes, in separating the non-hydrocarbon gas from the natural gas through use of the inorganic membrane made of an inorganic material which is housed in the separation module, heating the natural gas to be supplied to the separation module so that the temperature in the separation module is kept at a temperature higher than the dew point temperature of the heavy hydrocarbon, the heavy hydrocarbon having 5 or more carbon atoms, in response to a reduction in temperature in association with permeation of the non-hydrocarbon gas through the inorganic membrane. As a result, blockage in the inorganic membrane in association with liquefaction or solidification of the heavy hydrocarbon can be suppressed.

DESCRIPTION OF EMBODIMENTS

Figure 1:
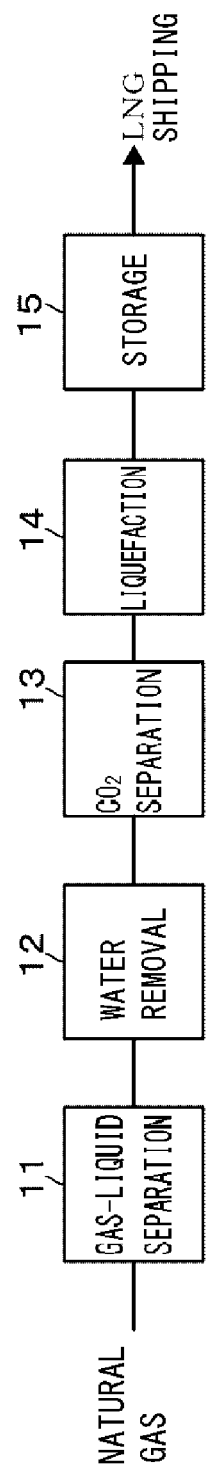
FIG. 1 is a step diagram for illustrating various treatment steps to be performed in a natural gas shipping terminal.

First, treatment on a natural gas to be performed in a liquefied natural gas (LNG) shipping terminal is summarized with reference to FIG. 1.

The natural gas to be handled in the shipping terminal of this example contains at least a non-hydrocarbon gas and a heavy hydrocarbon, the heavy hydrocarbon having 5 or more carbon atoms (for example, pentane), in addition to a natural gas component to serve as LNG. Examples of the non-hydrocarbon gas may include a carbon dioxide ($CO_2$) gas, a nitrogen ($N_2$) gas, a hydrogen sulfide ($H_2S$) gas, and water vapor ($H_2O$). In this example, a description is given of a case in which a $CO_2$ gas is separated as the non-hydrocarbon gas to be removed from the natural gas.

Figure 4:
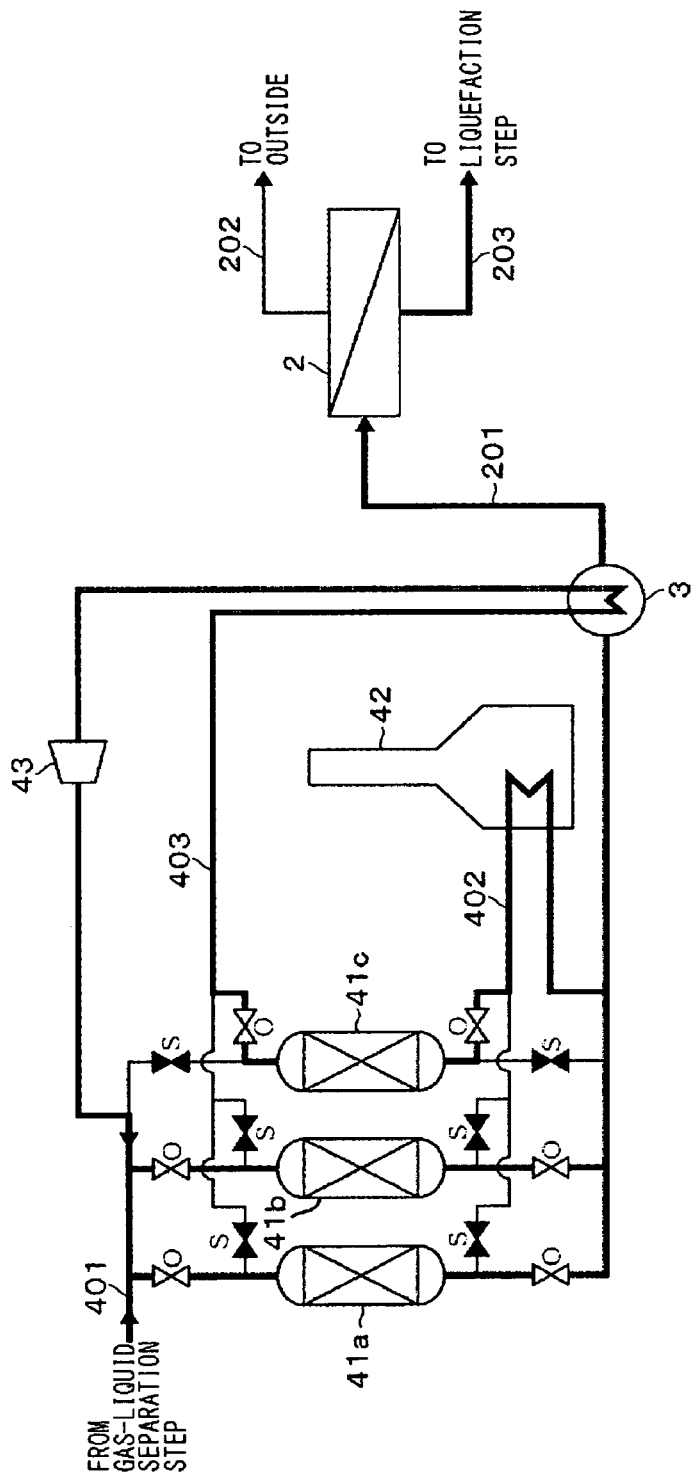
FIG. 4 is a configuration diagram of a system in which an adsorption column configured to adsorb water and a non-hydrocarbon gas separation device are arranged in combination.

As illustrated in FIG. 1, the natural gas is subjected to separation of a liquid in a gas-liquid separation step 11, and then to removal of water in a water removal step 12. An example of the configuration of the water removal step 12 is the use of adsorption columns 41a to 41c each of which is packed with an adsorbent, as illustrated in FIG. 4 described later.

Further, the natural gas is subjected to a $CO_2$ separation step 13, and then is liquefied to LNG in a liquefaction step 14.

Liquefaction pretreatment before liquefaction of the natural gas may include, as required, a mercury removal step of removing mercury in the natural gas by adsorbing mercury onto an adsorbent, and an acid gas removal step of removing an acid gas, such as hydrogen sulfide, by absorbing the acid gas into an absorption liquid, such as an amine, in addition to the steps illustrated in FIG. 1 (the gas-liquid separation step 11, the water removal step 12, and the $CO_2$ separation step 13).

In the liquefaction step 14, the natural gas is precooled to, for example, around −40° C. with a precooling refrigerant (containing as a main component propane), and further cooled to, for example, from −155° C. to −158° C. with a main refrigerant (a mixed refrigerant of methane, ethane, propane, and nitrogen). Thus, the natural gas is liquefied to LNG.

LNG having been liquefied is subjected to a storage step 15 in a LNG tank (not shown), and then shipped to a LNG tanker or a pipe line.

Herein, it has been described in the "Background Art" section that a non-hydrocarbon gas separation device has advantages of high energy saving performance and easy handleability when performing the $CO_2$ separation step 13.

Most of the non-hydrocarbon gas separation devices which have hitherto been practically used for separating a non-hydrocarbon gas from a natural gas have utilized organic membranes each using a polymer material.

However, when the natural gas contains a heavy hydrocarbon (hydrocarbon having 5 or more carbon atoms) as with the natural gas to be handled in the $CO_2$ separation step 13 of this example, there is a risk in that the organic membrane is dissolved and damaged by the heavy hydrocarbon. Therefore, the organic membrane was not able to be used for separation of a non-hydrocarbon gas from this kind of natural gas.

Meanwhile, for example, an inorganic membrane made of an inorganic material, such as a zeolite membrane, has a low risk of being dissolved and damaged by the heavy hydrocarbon. However, there are few examples in which the inorganic membrane is actually used in a large-size non-hydrocarbon gas separation device capable of treating the natural gas in a large amount, and an idea of using the inorganic membrane has only been described in patent literatures or the like.

The inventors of the present invention have made investigations on practical use of a non-hydrocarbon gas separation device utilizing an inorganic membrane. As a result, the inventors have found that, when the natural gas containing a heavy hydrocarbon is to be treated, it is required to make consideration also on an influence of a change in temperature caused when a non-hydrocarbon permeates the inorganic membrane on the heavy hydrocarbon.

That is, when the non-hydrocarbon gas in the natural gas is separated through use of a gas separation membrane, the non-hydrocarbon gas is adiabatically expanded. As a result, the temperature of the non-hydrocarbon gas is reduced owing to the Joule-Thomson effect along with irreversible adiabatic expansion of the non-hydrocarbon gas having permeated the gas separation membrane. Moreover, when the gas separation membrane is cooled with a reduction in temperature of the non-hydrocarbon gas, even the natural gas before permeation is cooled through heat transfer via the gas separation membrane.

In the following description, a space in which the natural gas before permeation through the gas separation membrane flows is referred to as "primary side", and a space in which the non-hydrocarbon gas flows is referred to as "secondary side" in some cases.

Even in the case in which the temperature of the natural gas is reduced on the primary side, when the content of the heavy hydrocarbon in the natural gas is sufficiently small, dew condensation of water hardly occurs by sufficiently removing water in the water removal step 12 as illustrated in FIG. 1, and it is not required to make consideration also on an influence on the gas separation membrane.

Meanwhile, some heavy hydrocarbons have a high dew point temperature as compared to hydrocarbons having 4 or less carbon atoms which constitute a large part of the natural gas. Therefore, when the surface of the gas separation membrane is cooled to the dew point temperature or less to allow condensation of the heavy hydrocarbon, and is further cooled to allow solidification of the heavy hydrocarbon, there is a risk in that blockage occurs in the gas separation membrane, and non-hydrocarbon gas separation performance is reduced.

In addition, there are not a few examples of non-conventional natural gases containing a non-hydrocarbon gas (in particular, a $CO_2$ gas having a high Joule-Thomson coefficient) at a relatively high concentration and a heavy hydrocarbon. Therefore, it has been found that prevention of blockage in the gas separation membrane owing to the heavy hydrocarbon is a significant issue in increasing the kind of the natural gas which can be treated with the non-hydrocarbon gas separation device.

At this time, for example, when a heavy oil component is removed in advance through use of an adsorbent or the like before separation of the non-hydrocarbon gas, the problem of blockage in the gas separation membrane in association with a reduction in temperature of the natural gas can be reduced. However, the removal of the heavy oil component through use of an adsorbent leads to loss of part of the natural gas to serve as a product.

In view of the above-mentioned problems, a non-hydrocarbon gas separation device according to an embodiment of the present invention employs an inorganic membrane made of an inorganic material less susceptible to an influence of the heavy hydrocarbon as a gas separation membrane, and has a configuration in which blockage in the inorganic membrane owing to the Joule-Thomson effect is suppressed.

A specific configuration of the non-hydrocarbon gas separation device is described below with reference to FIG. 2.

Figure 2:
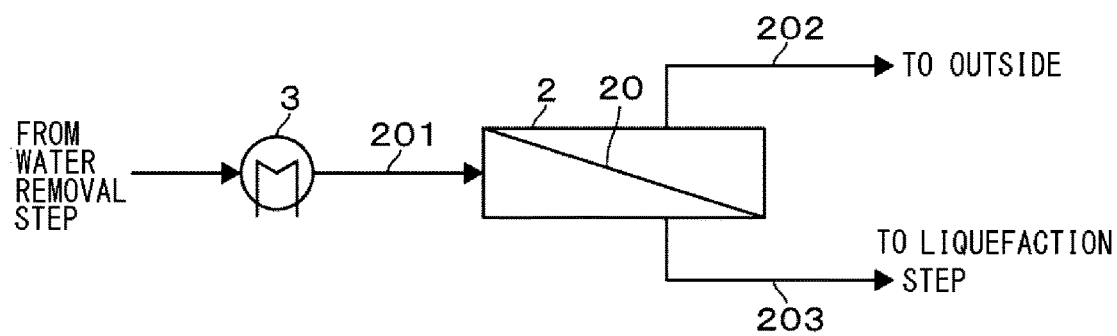
FIG. 2 is a configuration diagram of a non-hydrocarbon gas separation device arranged in a liquefaction pretreatment facility of the shipping terminal.

As illustrated in FIG. 2, the non-hydrocarbon gas separation device includes a separation module 2 in which an inorganic membrane 20 configured to separate a $CO_2$ gas from a natural gas is housed.

An inorganic material having high resistance to a heavy hydrocarbon as compared to an organic membrane made of a polymer material, such as a Deca-Dodecasil 3R (DDR)-type zeolite membrane, is employed as the inorganic membrane 20.

A specific structure of the inorganic membrane 20 is not limited to a particular type, but an example thereof is the use of a tubular member obtained by forming a DDR-type zeolite membrane on a surface of a tubular base made of a porous ceramic or the like. Moreover, the separation module 2 is configured by housing, in a metal main body, a plurality of the tubular members in each of which the inorganic membrane 20 has been formed, to thereby partition the main body into a space on a primary side in which the natural gas flows and a space on a secondary side in which a $CO_2$ gas having been separated from the natural gas flows.

A supply line 201 configured to supply the natural gas, a discharge line 202 configured to discharge the $CO_2$ gas having been separated from the natural gas, and an outflow line 203 configured to allow the natural gas having been separated from the $CO_2$ gas to outflow are each connected to the separation module 2.

The natural gas from which a liquid and water have been separated and removed in the gas-liquid separation step 11 and the water removal step 12, respectively, is supplied to the supply line 201. The natural gas to be supplied from the supply line 201 contains a $CO_2$ gas, which is a non-hydrocarbon, at a concentration of, for example, 5 mol % or more, preferably 20 mol % or more, more preferably from 40 mol % to 70 mol %. As the concentration of the $CO_2$ gas in the natural gas becomes higher, or a difference in pressure before and after permeation through the inorganic membrane 20 (a difference between a pressure on the primary side and a pressure on the secondary side) becomes larger, the temperature of the $CO_2$ gas having been separated (on the secondary side) tends to become lower.

The natural gas further contains a heavy hydrocarbon (hydrocarbon having 5 or more carbon atoms) at a concentration equal to or more than 0.1 ppm by mole and equal to or less than its saturation concentration at the temperature of the natural gas. A range of the concentration of the heavy hydrocarbon in which blockage may occur in the inorganic membrane 20 owing to condensation and solidification in association with a reduction in temperature and the separation performance may be reduced varies depending also on the temperature and pressure of the natural gas, and hence it is difficult to specify the range as a rule. Meanwhile, when the concentration of the heavy hydrocarbon in the natural gas to be treated falls within the above-mentioned range of concentration, such concentration can be said to be a concentration at which the above-mentioned phenomenon may occur, because it is required to consider the necessity for taking measures against a reduction in separation performance owing to blockage in the inorganic membrane 20.

The natural gas which has been separated from the $CO_2$ gas and in which the $CO_2$ concentration is reduced to, for example, a preset target concentration or less, preferably to a measurement limit concentration or less is transferred to the liquefaction step 14 on a downstream side through the outflow line 203.

Meanwhile, the $CO_2$ gas having been separated from the natural gas with the inorganic membrane 20 is discharged to an outside through the discharge line 202. The $CO_2$ gas may be, for example, stored in the ground through carbon dioxide capture and storage (CCS), or used as an injection gas for enhanced oil recovery (EOR) or enhanced gas recovery (EGR). In addition, utilization of the $CO_2$ gas as a raw material in a urea production plant is also conceivable.

Besides, the $CO_2$ gas may be transported through a pipe line for treatment on the $CO_2$ gas at a distance from a LNG shipping terminal.

In the non-hydrocarbon gas separation device having the above-mentioned configuration, a heating unit 3 configured to heat the natural gas is arranged on a supply line 201 side of the separation module 2.

As described above, when the $CO_2$ gas is separated from the natural gas through use of the inorganic membrane 20, the temperature of the $CO_2$ gas having been separated is reduced owing to the Joule-Thomson effect. Along with a reduction in temperature, the temperature of the natural gas brought into contact with the inorganic membrane 20 is also reduced. In this case, as described above, when the temperature of the natural gas brought into contact with the inorganic membrane 20 is reduced to below the dew point temperature of the heavy hydrocarbon, there is a risk in that blockage occurs in the inorganic membrane 20 owing to condensation and solidification of the heavy hydrocarbon, and $CO_2$ gas separation performance is reduced.

In view of the foregoing, the heating unit 3 of this example is configured to heat the natural gas in advance before its supply to the separation module 2 so that a temperature in the separation module 2 (in particular, the temperature of the natural gas containing a heavy hydrocarbon) is kept at a predetermined temperature higher than the dew point temperature of the heavy hydrocarbon (for example, at a temperature higher than the dew point temperature by 10° C.) even when a reduction in temperature occurs as described above.

An example of the heating unit 3 is a heat exchanger configured to heat the natural gas through heat exchange with a heating medium, but for example, heating with a heater may be employed.

A range of a reduction in temperature of the natural gas in the separation module 2 varies depending on, for example, the flow rate, composition, and specific heat of the natural gas, the composition, concentration, and Joule-Thomson coefficient of the non-hydrocarbon gas ($CO_2$ gas in this example), the total pressure in the separation module 2 on the primary side and the secondary side, and the partial pressure of the non-hydrocarbon gas.

Therefore, it is difficult to present the amount of heat to be supplied to the natural gas with the heating unit 3 as a rule, but the range of a reduction in temperature may be generally determined based on a value obtained by integrating the Joule-Thomson coefficient of the non-hydrocarbon gas in a pressure interval from the partial pressure of the non-hydrocarbon gas on the primary side to the partial pressure of the non-hydrocarbon gas on the secondary side in the separation module 2. In addition, the range of a reduction in temperature may also be calculated through use of a process simulator, such as PRO/II (U.S. registered trademark).

In addition, the amount of heat to be supplied with the heating unit 3 is determined based on the range of a reduction in temperature, the flow rate of the natural gas, and the thermophysical properties of the natural gas, such as specific heat, so that the temperature in the separation module 2 (in particular, the temperature of the natural gas) is kept at a temperature higher than the dew point temperature of a component having the lowest dew point temperature among heavy hydrocarbons contained in the natural gas.

Actions of the non-hydrocarbon gas separation device having the configuration described above are described.

When the natural gas from which a liquid and water have been separated and removed in the steps 11 and 12 on an upstream side passes through the heating unit 3, heat in a preset amount is supplied through heat exchange with a heating medium to heat the natural gas. After that, when the natural gas having been supplied to the separation module 2 is brought into contact with the inorganic membrane 20, the $CO_2$ gas in the natural gas permeates the inorganic membrane 20 to be separated from the natural gas.

At this time, the temperature of the $CO_2$ gas having been separated is reduced owing to the Joule-Thomson effect, but the temperature of the natural gas on the primary side is kept at a temperature higher than the dew point temperature of the heavy hydrocarbon because the natural gas is heated in advance with the heating unit 3.

As a result, condensation and solidification of the heavy hydrocarbon can be prevented in the natural gas, and a reduction in separation performance can be suppressed.

In addition, the $CO_2$ gas having been separated from the natural gas with the inorganic membrane 20 is discharged to an outside through the discharge line 202, and the natural gas having been separated from the $CO_2$ gas is transferred to the liquefaction step 14 on a downstream side through the outflow line 203.

Herein, when the flow rate of the natural gas to be supplied to the separation module 2 varies, or the composition of the natural gas varies (including the cases in which the composition of the heavy hydrocarbon varies and the concentration of the $CO_2$ gas varies), the amount of heat to be newly supplied is calculated in response to these variations based on the above-mentioned calculation of the amount of heat to be supplied. When the amount of heat to be supplied from a heating medium side of the heating unit 3 is controlled in accordance with the calculation result, the temperature of the natural gas in the separation module 2 can be kept at a temperature higher than the dew point temperature of the heavy hydrocarbon.

In addition, for example, there may be performed feedback control in which the amount of heat to be supplied to the natural gas with the heating unit 3 is increased or reduced based on a detection result of the temperature of the space on the secondary side of the separation module 2. In this case, when the dew point temperature of the heavy hydrocarbon changes with, for example, a change in the composition of the natural gas, a target value of the temperature in the separation module 2 is changed in response to the change in dew point temperature.

The non-hydrocarbon gas separation device according to this embodiment has the following effects. When the non-hydrocarbon gas (for example, the $CO_2$ gas) is separated from the natural gas through use of the inorganic membrane 20 made of an inorganic material which is housed in the separation module 2, the natural gas to be supplied to the separation module 2 is heated with the heating unit so that the temperature in the separation module 2 is kept at a temperature higher than the dew point temperature of the heavy hydrocarbon in response to a reduction in temperature in association with permeation of the non-hydrocarbon gas through the inorganic membrane 20. As a result, blockage in the inorganic membrane 20 owing to liquefaction or solidification of the heavy hydrocarbon can be suppressed.

Next, an embodiment in which the separation of the $CO_2$ gas from the natural gas is divided into a plurality of stages is described with reference to FIG. 3.

Figure 3:
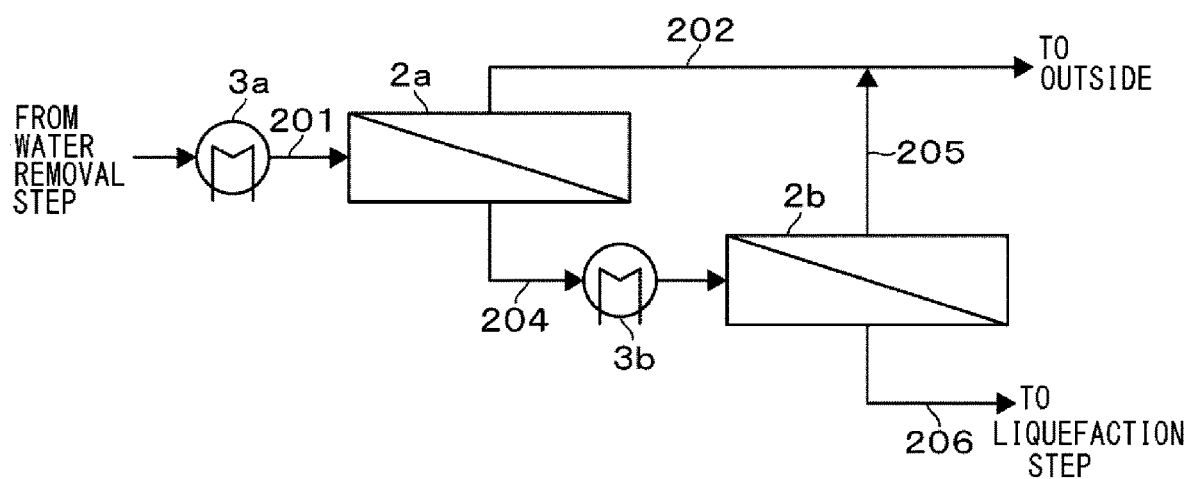
FIG. 3 is a configuration diagram of a non-hydrocarbon gas separation device according to a second embodiment.
Figure 5:
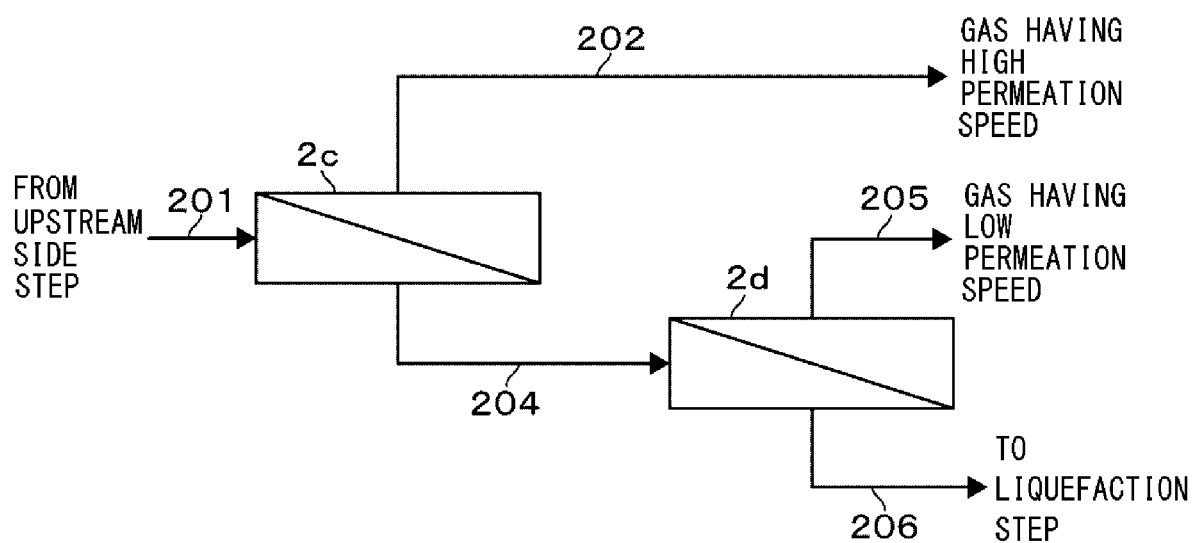
FIG. 5 is a configuration diagram of a non-hydrocarbon gas separation device according to Reference Example.

In examples illustrated in FIG. 3 to FIG. 5, constituents in common with the non-hydrocarbon gas separation device illustrated in FIG. 2 are denoted by the same symbol.

A non-hydrocarbon gas separation device illustrated in FIG. 3 includes, for example, two separation modules 2a and 2b. The inorganic membrane 20 is housed in each of the separation modules 2a and 2b, and the separation modules 2a and 2b are connected to each other in series through a connection line 204. The connection line 204 corresponds to an outflow line configured to allow the natural gas to outflow when seen from the separation module 2a on an upstream side, and to a supply line configured to supply the natural gas when seen from the separation module 2b on a downstream side.

In the separation module 2b on the downstream side, a space on a secondary side in which the $CO_2$ gas having been separated from the natural gas flows is connected to a discharge line 202 for a $CO_2$ gas through an intermediate line 205. Further, the separation module 2b on the downstream side is connected to an outflow line 206 configured to allow the natural gas having been separated from the $CO_2$ gas to outflow.

Also in the non-hydrocarbon gas separation device of this example, heating units 3a and 3b for keeping the temperatures in the separation modules 2a and 2b (in particular, the temperature of the natural gas) at temperatures higher than the dew point temperature of the heavy hydrocarbon are arranged on inlet sides of the separation modules 2a and 2b (a supply line 201 side and a connection line 204 side), respectively.

Herein, as calculation results are shown in Examples described below, it has been revealed that, when the separation of the $CO_2$ gas from the natural gas is divided into the separation modules 2a and 2b on a plurality of stages, and the heating units 3a and 3b are arranged on the inlet sides of the separation modules 2a and 2b, respectively, an energy consumption amount can be reduced as compared to the case in which the heating unit 3a is arranged only on the inlet side of the separation module 2a on the upstream side so as to keep the temperatures in the separation modules 2a and 2b at temperatures higher than the dew point temperature of the heavy hydrocarbon.

However, even when a plurality of separation modules 2a and 2b are connected in series as illustrated in FIG. 3, it is not required to arrange the heating units 3a and 3b on all the separation modules 2a and 2b. For example, there may be adopted a configuration in which the heating unit 3a or 3b is arranged on at least one of the separation modules 2a and 2b whose internal temperature may be reduced to the dew point temperature of the heavy hydrocarbon or less in accordance with temperature reduction conditions in the separation modules 2a and 2b.

In addition, the number of the separation modules 2a and 2b to be connected in series is not limited to two, and three or more separation modules may be connected in series.

Next, an example in which a regeneration gas for adsorption columns 41a to 41c configured to perform the water removal step 12 is utilized as the heating medium of the heating unit 3 is described with reference to FIG. 4.

Open/close valves are illustrated together with pipe lines in FIG. 4 as required. Of those open/close valves, an open/close valve in an "opened state" is represented by white blank and also a symbol "O" is illustrated, and an open/close valve in a "closed state" is represented by solid black and also a symbol "S" is illustrated. In addition, a pipe line through which the natural gas flows is represented by a heavy line.

For example, the three adsorption columns 41a to 41c are connected in parallel to a supply line 401 configured to supply the natural gas from which a liquid has been separated in the gas-liquid separation step 11. The adsorption columns 41a to 41c are each packed with an adsorbent, such as synthetic zeolite, serving as a molecular sieve for adsorbing and removing water in the natural gas.

On natural gas outlet sides of the adsorption columns 41a to 41c, lines each configured to allow the natural gas from which water has been removed to outflow are joined together to form a supply line 201 configured to supply the natural gas to the non-hydrocarbon gas separation device. The heating unit 3 described above is arranged in the supply line 201.

In addition, a regeneration gas line 402 configured to extract part of the natural gas from which water has been removed and supply the natural gas to the adsorption columns 41a to 41c during a regeneration operation is connected to the supply line 201 on an upstream side of the heating unit 3. A heating furnace 42 is arranged in the regeneration gas line 402, and thus the regeneration gas can be heated to a predetermined temperature. When the regeneration gas having been heated is allowed to flow through the adsorption columns 41a to 41c during a regeneration operation, water having been adsorbed onto the adsorbent is released to the regeneration gas, and thus the adsorbent is regenerated.

On regeneration gas outlet sides of the adsorption columns 41a to 41c, lines each configured to allow the regeneration gas containing released water to outflow are joined together to form a circulation line 403. A compressor 43 configured to compress the regeneration gas and cool the regeneration gas with a cooler (not shown), to thereby remove water through condensation is arranged in the circulation line 403. The regeneration gas from which water has been removed is joined to the supply line 401 on an adsorption column 41a to 41c side.

In the non-hydrocarbon gas separation device of this example, the regeneration gas which flows through the circulation line 403 described above is utilized as the heating medium of the heating unit 3. When an amount of heat required for releasing water from the adsorbents in the adsorption columns 41a to 41c during a regeneration operation to the regeneration gas and an amount of heat required for keeping the temperature in the separation module 2 at a temperature higher than the dew point temperature of the heavy hydrocarbon are supplied with a common heater 42, heat sources for the heating medium can be integrated.

In the example illustrated in FIG. 4, there may be set a sequence of regeneration operations of the adsorption columns 41a to 41c in which a regeneration operation is performed in any one of the three adsorption columns 41a to 41c (the adsorption column 41c in the example illustrated in FIG. 4) in order so that the heating medium (regeneration gas) is constantly and stably supplied to the heating unit 3.

In addition, it is also appropriate to arrange a bypass line for a regeneration gas on the heating unit 3 to change a flow rate ratio of the heating mediums flowing through the heating unit 3 and the bypass line, or to arrange an auxiliary heating unit using a heating medium (for example, steam) different from the regeneration gas as a heat source upstream or downstream of the heating unit 3. With those configurations, the amount of heat to be supplied to the natural gas to be supplied to the heat module 2 can be controlled independently of the regeneration operation on the adsorption column 41a to 41c side.

In addition, the adsorption columns 41a to 41c are not limited to perform removal of water, and may perform removal of part of the heavy hydrocarbon. As described above, with the non-hydrocarbon gas separation device of this example, in which the temperature in the separation module 2 is kept at a temperature equal to or higher than the dew point temperature of the heavy hydrocarbon gas, loss caused through preliminary removal of the heavy hydrocarbon gas can be reduced. However, removal of part of the heavy hydrocarbon may be performed when loss caused through removal of part of the heavy hydrocarbon gas (adsorption removal through use of an adsorbent in this example) and a cost (for example, a fuel cost for the heater 42) required for keeping the temperature in the separation module 2 at a temperature higher than the dew point temperature without removal of the heavy hydrocarbon gas are compared to each other, and it is economical to select the former.

In the embodiments described with reference to FIG. 1 to FIG. 4, the $CO_2$ gas has been presented as an example of the non-hydrocarbon gas to be separated through use of the inorganic membrane 20. However, the non-hydrocarbon gas which can be separated with the inorganic membrane 20 is not limited to the $CO_2$ gas. It goes without saying that, for example, a nitrogen gas ($N_2$ gas), a hydrogen sulfide gas ($H_2S$ gas), or water vapor may be separated.

Next, a non-hydrocarbon gas separation device according to Reference Example is described with reference to FIG. 5.

In the non-hydrocarbon gas separation device according to Reference Example, a separation module 2c on a first stage configured to separate a gas having a high permeation speed from a natural gas and a separation module 2d on a second stage configured to separate a gas having a low permeation speed as compared to the gas having a high permeation speed are connected to each other in series through a connection line 204.

For example, there is given a case in which water is separated as the gas having a high permeation speed in the separation module 2c on the first stage, and a $CO_2$ gas is separated as the gas having a low permeation speed as compared to water in the separation module 2d on the second stage. In addition, it is also appropriate to separate a $CO_2$ gas in the separation module 2c on the first stage and a $N_2$ gas in the separation module 2d on the second stage.

It is also appropriate to further connect a separation module on a third stage in series, and adopt a configuration (not shown) in which water, a $CO_2$ gas, and a $N_2$ gas are separated on the first stage, the second stage, and the third stage, respectively. It is also appropriate to still further connect a separation module on a fourth stage in series, and adopt a configuration (not shown) in which water, a $CO_2$ gas, a $N_2$ gas, and a $H_2S$ gas are separated on the first stage, the second stage, the third stage, and the fourth stage, respectively.

In the non-hydrocarbon gas separation device according to Reference Example, it is not essential to arrange a heating unit on an inlet side on each stage.

EXAMPLES (Calculation of Gas Temperature and Amount of Heat to be Supplied)

When a non-hydrocarbon gas was separated through use of each of the non-hydrocarbon gas separation devices illustrated in FIG. 2 and FIG. 3, a change in temperature of a natural gas in the treatment module 2 and the amount of heat to be supplied with the heating unit 3 for keeping the temperature of the natural gas in the treatment module 2 at a temperature higher than a dew point temperature were calculated.

Example 1

A. Calculation Conditions

The supply conditions (a temperature, a pressure, and a flow rate) and composition (hydrocarbons are saturated hydrocarbons, and hydrocarbons having 3 or more carbon atoms are linear hydrocarbons) of a natural gas to be supplied to the non-hydrocarbon gas separation device are shown in (Table 1). A heavy hydrocarbon component having the lowest dew point temperature in the natural gas has a dew point temperature of 35° C.

The temperature of the natural gas in which a $CO_2$ gas had been reduced to 5 mol % with the separation module 2 described with reference to FIG. 1 and the outlet temperature of the heating unit 3 required for keeping the temperature of the natural gas in the separation module 2 at a temperature higher than the dew point temperature by 10° C. were calculated with PRO/II.

TABLE 1

|  |  | Natural gas |
|---|---|---|
| Temperature | ° C. | 45 |
| Pressure | kPa | 8,000 |
| Flow rate | kg-mol/hr | 300 |
| Composition |  |  |
| Carbon dioxide | mol % | 50.0 |
| Nitrogen | mol % | 4.0 |
| Hydrogen sulfide | mol % | 2.0 |
| Methane | mol % | 40.0 |
| Ethane | mol % | 2.0 |
| Propane | mol % | 1.0 |
| Butane | mol % | 0.4 |
| Pentane | mol % | 0.3 |
| Hydrocarbons having 6 or more carbon atoms | mol % | 0.3 |

B. Calculation Results

It was revealed that the natural gas was cooled to 6° C. in the separation module owing to the Joule-Thomson effect under the above-mentioned calculation conditions. The temperature was below the dew point temperature (35° C.) of the heavy hydrocarbon, and hence the heavy hydrocarbon gas was expected to be liquefied.

In view of the foregoing, as illustrated in FIG. 2, when the natural gas was heated with the heating unit 3 arranged on a supply line 201 side of the separation module 2, the outlet temperature of the heating unit 3 required for keeping the temperature of the natural gas in the separation module 2 at 45° C. (the dew point temperature (35° C.) of the heavy hydrocarbon+10° C.) was 78° C. It was confirmed that, when the heating unit 3 was arranged, blockage in the inorganic membrane 20 in the separation module 2 was able to be prevented and a reduction in separation performance was able to be suppressed.

(Example 2-1) Separation of $CO_2$ Gas

A. Calculation Conditions

A natural gas under the same conditions as in (Table 1) (shown again in (Table 2)) was subjected to treatment of separating a $CO_2$ gas therefrom as a non-hydrocarbon gas through use of the two-stage separation modules 2a and 2b illustrated in FIG. 3. At this time, the outlet temperatures of the heating units 3a and 3b and the amounts of heat to be supplied with the heating units 3a and 3b required for keeping the temperature of the natural gas at 45° C. in the separation modules 2a and 2b were calculated.

In addition, as Example for comparison, the amount of heat to be supplied required for keeping the temperature of the natural gas at 45° C. in the separation modules 2a and 2b only through use of the heating unit 3a on an upstream side without arranging the heating unit 3b on a downstream side was also calculated.

The flow rate and composition of the natural gas (hereinafter referred to as "outflow gas") which flows through the outflow line 206 are shown in (Table 2).

TABLE 2

|  |  | Natural gas | Outflow gas |
|---|---|---|---|
| Temperature | ° C. | 45 | 45 |
| Pressure | kPa | 8,000 | 8,000 |
| Flow rate | kg-mol/hr | 300 | 151 |
| Composition |  |  |  |
| Carbon dioxide | mol % | 50.0 | 5.0 |
| Nitrogen | mol % | 4.0 | 5.3 |
| Hydrogen sulfide | mol % | 2.0 | 3.9 |
| Methane | mol % | 40.0 | 77.9 |
| Ethane | mol % | 2.0 | 3.9 |
| Propane | mol % | 1.0 | 2.0 |
| Butane | mol % | 0.4 | 0.8 |
| Pentane | mol % | 0.3 | 0.6 |
| Hydrocarbons having 6 or more carbon atoms | mol % | 0.3 | 0.6 |

B. Calculation Results

The calculation results were that the outlet temperature of the heating unit 3a on the upstream side and the outlet temperature of the heating unit 3b on the downstream side needed to be 59° C. and 57° C., respectively, for keeping the temperature of the natural gas at 45° C. in the separation modules 2a and 2b under the above-mentioned calculation conditions. At this time, the total amount of heat to be supplied with the heating units 3a and 3b was 109 Mcal/hr.

As compared to this, when the temperature of the natural gas was kept at 45° C. in the separation modules 2a and 2b only through use of the heating unit 3a on the upstream side without arranging the heating unit 3b on the downstream side, it was required to supply an amount of heat of 129 Mcal/hr.

From the above-mentioned results, it was revealed that, when a $CO_2$ gas was the non-hydrocarbon gas to be separated with the inorganic membrane 20, the amount of heat to be supplied was able to be reduced by arranging the heating units 3a and 3b on supply line 201 and 204 sides of the separation modules 2a and 2b, as compared to the case in which the heating unit 3a was arranged only on the first stage.

(Example 2-2) Separation of $N_2$ Gas

A. Calculation Conditions

A natural gas under the conditions shown in (Table 3) was subjected to treatment of separating a nitrogen gas ($N_2$ gas) therefrom as a non-hydrocarbon gas under the same conditions as in (Example 2-1). At this time, the outlet temperatures of the heating units 3a and 3b and the amounts of heat to be supplied with the heating units 3a and 3b required for keeping the temperature of the natural gas at 45° C. in the separation modules 2a and 2b were calculated.

In addition, as Example for comparison, the amount of heat to be supplied required for keeping the temperature of the natural gas at 45° C. in the separation modules 2a and 2b only through use of the heating unit 3a on an upstream side without arranging the heating unit 3b on a downstream side was also calculated.

The flow rate and composition of the outflow gas are shown in (Table 3).

TABLE 3

|  |  | Natural gas | Outflow gas |
|---|---|---|---|
| Temperature | ° C. | 45 | 53 |
| Pressure | kPa | 8,000 | 8,000 |
| Flow rate | kg-mol/hr | 300 | 122 |
| Composition |  |  |  |
| Carbon dioxide | mol % | 4.0 | 0.0 |
| Nitrogen | mol % | 50.0 | 5.0 |
| Hydrogen sulfide | mol % | 2.0 | 4.5 |
| Methane | mol % | 40.0 | 81.8 |
| Ethane | mol % | 2.0 | 3.8 |
| Propane | mol % | 1.0 | 2.4 |
| Butane | mol % | 0.4 | 1.0 |
| Pentane | mol % | 0.3 | 0.7 |
| Hydrocarbons having 6 or more carbon atoms | mol % | 0.3 | 0.7 |

B. Calculation Results

The calculation results were that the outlet temperature of the heating unit 3a on the upstream side and the outlet temperature of the heating unit 3b on the downstream side needed to be 50° C. and 55° C., respectively, for keeping the temperature of the natural gas at 45° C. in the separation modules 2a and 2b under the above-mentioned calculation conditions. At this time, the total amount of heat to be supplied with the heating units 3a and 3b was 35 Mcal/hr.

As compared to this, when the temperature of the natural gas was kept at 45° C. in the separation modules 2a and 2b only through use of the heating unit 3a on the upstream side without arranging the heating unit 3b on the downstream side, it was required to supply an amount of heat of 44 Mcal/hr.

From the above-mentioned results, it was revealed that, also when a $N_2$ gas was the non-hydrocarbon gas to be separated with the inorganic membrane 20, the amount of heat to be supplied was able to be reduced by arranging the heating units 3a and 3b on supply line 201 and 204 sides of the separation modules 2a and 2b, as compared to the case in which the heating unit 3a was arranged only on the first stage.

(Example 2-3) Separation of $H_2S$ Gas

A. Calculation Conditions

A natural gas under the conditions shown in (Table 4) was subjected to treatment of separating a hydrogen sulfide gas ($H_2S$ gas) therefrom as a non-hydrocarbon gas under the same conditions as in (Example 2-1). At this time, the outlet temperatures of the heating units 3a and 3b and the amounts of heat to be supplied with the heating units 3a and 3b required for keeping the temperature of the natural gas at 45° C. in the separation modules 2a and 2b were calculated.

In addition, as Example for comparison, the amount of heat to be supplied required for keeping the temperature of the natural gas at 45° C. in the separation modules 2a and 2b only through use of the heating unit 3a on an upstream side without arranging the heating unit 3b on a downstream side was also calculated.

The flow rate and composition of the outflow gas are shown in (Table 4).

TABLE 4

|  |  | Natural gas | Outflow gas |
|---|---|---|---|
| Temperature | ° C. | 45 | 55 |
| Pressure | kPa | 8,000 | 8,000 |
| Flow rate | kg-mol/hr | 300 | 110 |
| Composition |  |  |  |
| Carbon dioxide | mol % | 4.0 | 0.0 |
| Nitrogen | mol % | 4.0 | 0.0 |
| Hydrogen sulfide | mol % | 20.0 | 5.0 |
| Methane | mol % | 68.0 | 87.7 |
| Ethane | mol % | 2.0 | 1.9 |
| Propane | mol % | 1.0 | 2.7 |
| Butane | mol % | 0.4 | 1.1 |
| Pentane | mol % | 0.3 | 0.8 |
| Hydrocarbons having 6 or more carbon atoms | mol % | 0.3 | 0.8 |

B. Calculation Results

The calculation results were that the outlet temperature of the heating unit 3a on the upstream side and the outlet temperature of the heating unit 3b on the downstream side needed to be 59° C. and 66° C., respectively, for keeping the temperature of the natural gas at 45° C. in the separation modules 2a and 2b under the above-mentioned calculation conditions. At this time, the total amount of heat to be supplied with the heating units 3a and 3b was 108 Mcal/hr.

As compared to this, when the temperature of the natural gas was kept at 45° C. in the separation modules 2a and 2b only through use of the heating unit 3a on the upstream side without arranging the heating unit 3b on the downstream side, it was required to supply an amount of heat of 137 Mcal/hr.

From the above-mentioned results, it was revealed that, also when a $H_2S$ gas was the non-hydrocarbon gas to be separated with the inorganic membrane 20, the amount of heat to be supplied was able to be reduced by arranging the heating units 3a and 3b on supply line 201 and 204 sides of the separation modules 2a and 2b, as compared to the case in which the heating unit 3a was arranged only on the first stage.

Example 3

A. Calculation Conditions

When a $CO_2$ gas in a natural gas was reduced to 5 mol % under the same conditions as in (Example 1) through use of a system described with reference to FIG. 4, the conditions of a regeneration gas to be used in the heating unit 3 (outlet temperature: 78° C., temperature of the natural gas in the heat module 2: 45° C.) were calculated.

B. Calculation Results

It was revealed that, when the system illustrated in FIG. 4 was used, the amount of heat required in (Example 1) (equal to 129 Mcal/hr having been calculated in Example for comparison in (Example 2-1)) was able to be supplied by setting the inlet temperature of the heating medium (regeneration gas) of the heating unit 3 to 260° C., and the flow rate of the heating medium to 15% of the flow rate of the natural gas.

Those conditions are sufficiently realizable values as operation conditions of a regeneration operation of the adsorption columns 41a to 41c in which water in the natural gas is adsorbed and removed. In addition, when the regeneration gas utilized for the regeneration operation of the adsorption columns 41a to 41c is utilized, there is no need to separately load a heat source for heating the heating medium of the heating unit 3 from an outside, and hence the total amount of heat to be loaded into a shipping terminal can be reduced.

REFERENCE SIGNS LIST 2, 2a, 2b separation module
20 inorganic membrane
201 supply line
202 discharge line
203 outflow line
3, 3a, 3b heating unit
41a to 41c adsorption column
403 regeneration gas line

The invention claimed is:

1. A non-hydrocarbon gas separation method, comprising separating, from a natural gas containing 20 mol % or more of a non-hydrocarbon gas comprising at least one selected from the group consisting of a carbon dioxide gas, a nitrogen gas, and a hydrogen sulfide gas, the non-hydrocarbon gas separation method comprising the steps of:
supplying the natural gas containing a heavy hydrocarbon, the heavy hydrocarbon having 5 or more carbon atoms, to at least two separation modules in which an inorganic membrane made of an inorganic material is housed, and which are connected to each other in series, from a supply line connected to each of the at least two separation modules;
allowing the non-hydrocarbon gas contained in the natural gas supplied from the supply line to permeate the inorganic membrane in each of the at least two separation modules to be separated, followed by discharging the non-hydrocarbon gas having been separated from the natural gas from a discharge line connected to each of the at least two separation modules;
allowing the natural gas having been separated from the non-hydrocarbon gas to flow through each of the at least two separation modules, followed by allowing the natural gas to outflow from an outflow line connected to each of the at least two separation modules; and
heating, with a heating unit which is arranged on a supply line side of at least one of the at least two separation modules on or after a second stage, and is configured to heat the natural gas, the natural gas to be supplied to the separation module so that a temperature in the outflow line or the discharge line connected to the separation module is kept at a temperature higher than a dew point temperature of the heavy hydrocarbon in the outflow line in response to a reduction in temperature in association with permeation of the non-hydrocarbon gas through the inorganic membrane.

2. A non-hydrocarbon gas separation device, which is configured to separate, from a natural gas containing 20 mol % or more of a non-hydrocarbon gas comprising at least one selected from the group consisting of a carbon dioxide gas, a nitrogen gas, and a hydrogen sulfide gas, the non-hydrocarbon gas separation device comprising:
at least two separation modules which are each connected to a supply line configured to supply the natural gas containing a heavy hydrocarbon, the heavy hydrocarbon having 5 or more carbon atoms, an outflow line configured to allow the natural gas having been separated from the non-hydrocarbon gas to outflow, and to a discharge line configured to discharge the non-hydrocarbon gas having been separated from the natural gas, and which are connected to each other in series;

an inorganic membrane made of an inorganic material, which is housed in each of the at least two separation modules, and is configured to allow the non-hydrocarbon gas contained in the natural gas supplied from the supply line to permeate therethrough to a discharge line side, and to allow the natural gas having been separated from the non-hydrocarbon gas to flow to an outflow line side; and a heating unit which is arranged on a supply line side of at least one of the at least two separation modules on or after a second stage, and is configured to heat the natural gas, and wherein the heating unit is configured to heat the natural gas to be supplied to the separation module having arranged on the supply line side the heating unit so that a temperature in the outflow line or the discharge line connected to the separation module is kept at a temperature higher than a dew point temperature of the heavy hydrocarbon in the outflow line in response to a reduction in temperature in association with permeation of the non-hydrocarbon gas through the inorganic membrane.

3. A non-hydrocarbon gas separation device according to claim 2, wherein the non-hydrocarbon gas separation device comprises:

an adsorption column packed with an adsorbent for adsorbing at least any one of water or the heavy hydrocarbon; and a regeneration gas line configured to supply a preheated regeneration gas to the adsorption column for a regeneration operation of heating the adsorbent to allow a component having been adsorbed thereon to be released, and wherein the heating unit comprises a heating unit using the regeneration gas as a heat source.

* * * * *